Jan. 19, 1965  A. R. BRILHART  3,166,319
TUBULAR LAMINATED GOLF CLUB SHAFT AND METHOD OF FORMING SAME
Filed March 20, 1961
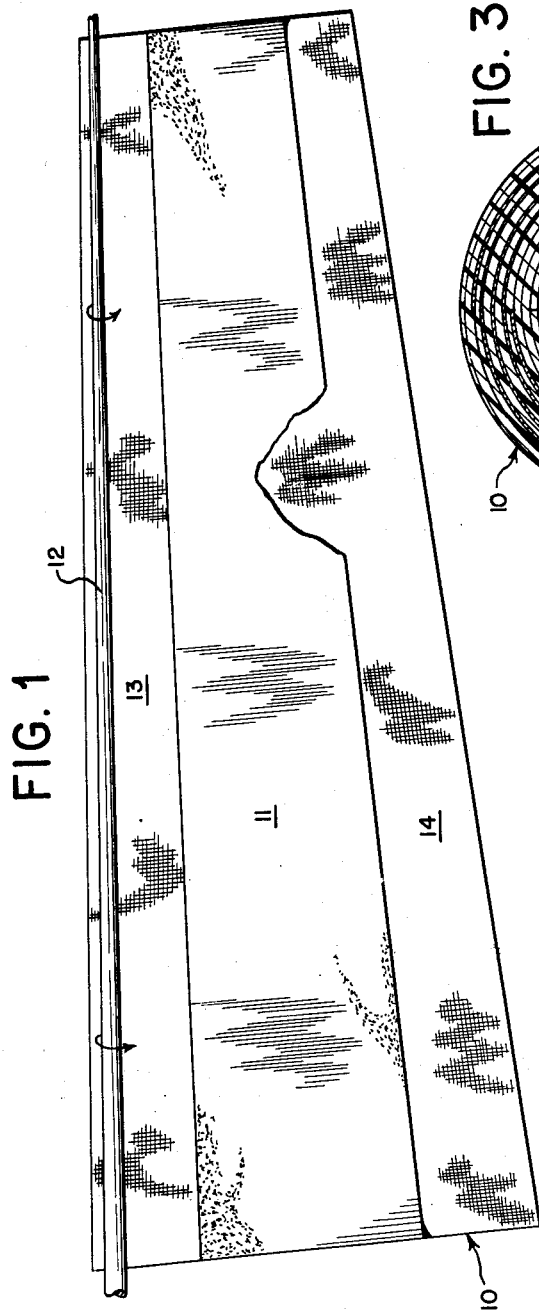
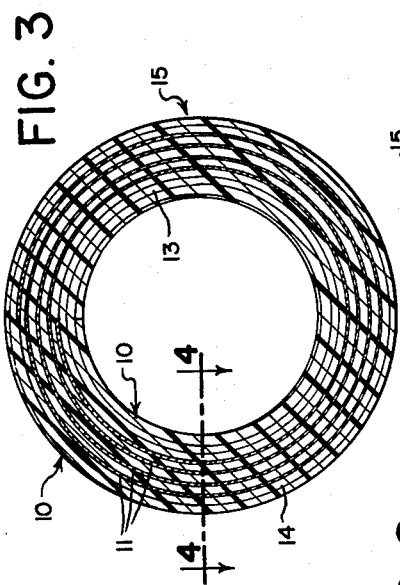
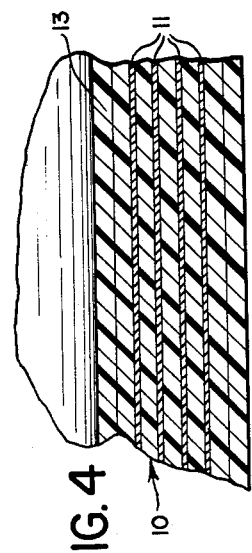
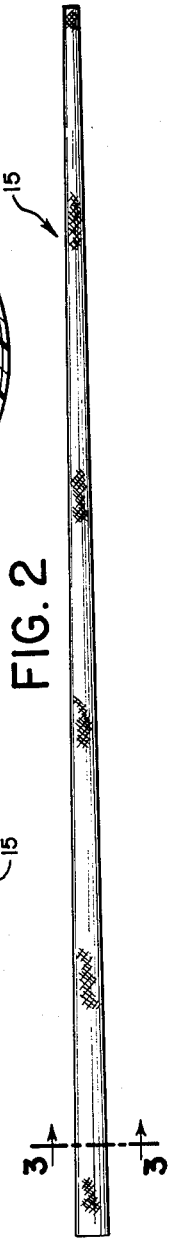
INVENTOR.
Arnold R. Brilhart
BY
ATTORNEYS United States Patent Office 3,166,319
Patented Jan. 19, 1965

3,166,319
TUBULAR LAMINATED GOLF CLUB SHAFT AND
METHOD OF FORMING SAME
Arnold R. Brilhart, Carlsbad, Calif., assignor to Brilhart Musical Instrument Corporation, Carlsbad, Calif., a corporation of New York
Filed Mar. 20, 1961, Ser. No. 96,834
12 Claims. (Cl. 273—80)

This invention relates generally to golf club shafts and specifically to a novel laminated golf-club shaft and its method of manufacture.

Generally, the performance of a golf club is dependent upon such factors as the weight and balance of the shaft, the flexibility of the shaft at positions along its length, the ability of the shaft to withstand shock and continued use, and the resistance of the shaft to moisture and other climatic conditions. A shaft of optimum design must also have a minimum of air resistance or drag during rapid strokes of the golf club. Each of these factors must, in its own way determine the design of a given golf-club shaft in relation to the characteristics and limitations of the materials used for shaft construction.

Much effort and money have been expended to produce at reasonable cost golf club shafts having desired performance characteristics. Improvements have been made largely by the selection and adaptation of new materials and by the development of new manufacturing techniques. Thus, the first golf club shafts were made of a suitable solid hard wood such as hickory. These have been supplanted almost entirely by tapered shafts of tempered tubular steel chosen for its relatively greater strength to mass ratio and greater uniformity of performance. Nevertheless, the manufacture of tubular steel shafts and their adaption to golf clubs are not without difficulties. The manufacturing process for such shafts requires expensive drawing, tapering and tempering operations. The wall thickness of such shafts is critical and must be rigidly controlled due to considerations of weight, strength, and flexibility. But despite rigid controls it is difficult to maintain the desired wall thickness throughout the length of the shaft. These difficulties have created a new need for improvements in shaft construction and manufacturing techniques.

To meet this need I have invented a laminated golf-club shaft comprising a plurality of interleaving layers of fabric or cloth and sheet metal, wherein each layer is securely bonded to the next adjacent layer. In one form of the invention, the shaft may comprise, for example, the combination of glass cloth and tempered steel, a layer of each material being interwound within the other to form the adjacent layers of the laminate. This arrangement possesses the advantage of fully utilizing the tempered steel sheet for reinforcing and rigidizing the glass cloth, while the overall weight of the shaft may be kept to a minimum. The shaft may be tapered in accordance with current design practices and the wall thickness of the shaft may be built-up to any desired thickness. Thus wall thickness may be made uniform throughout the shaft length, or may be selectively varied at any position along the length of the shaft to produce new and useful results. Where particular requirements make it desirable, a part or even all of the shaft may be made solid.

According to a particular form of my new method of manufacture, but one to which the invention is to not be limited, a fabric such as glass cloth is first cut to a predetermined flat pattern. The glass cloth may be impregnated with a suitable adhesive such as epoxy resin, or the resin may be separately introduced as a later step in my method. A thin metal sheet, for example, of tempered steel having a shim-stock thickness of .001" to .004" is cut to a predetermined flat pattern form. The two layers of material will have approximately the same length but the glass cloth will be of somewhat greater width. The metal sheet will be superimposed upon the glass cloth intermediate its breadth to leave along each edge, uncovered marginal strips of cloth. One of the marginal strips of cloth will be attached to a mandrel having a given taper. The mandrel will be rotated to wind or roll the adjacent layers of glass cloth and metal sheet into a tapered tube. Each of the marginal edges of cloth will be sufficiently wide to accommodate at least one complete turn about the mandrel, such that the initial and final turns of the tube will consist only of glass cloth. Thus, the metal sheet is completely enveloped by the glass cloth for protection from contamination by air, moisture, etc. Many color and texture variations of the finished shaft are possible merely by changing the weave and color of the glass cloth and by the proper use of pigments in the adhesive.

These and other aspects of the invention will be evident, upon an examination of the following description of a particular embodiment and of the accompanying drawings in which:

FIG. 1 illustrates a preliminary step of the method of the invention wherein sheets of glass cloth and sheet metal are arranged to be rolled upon a mandrel to form a tubular laminated golf club shaft.

FIG. 2 illustrates in reduced scale, a tapered laminated shaft formed by the method of the present invention.

FIG. 3 is an enlarged radial cross-sectional view taken in the direction of the arrows 3—3 of FIG. 2; and FIG. 4 is a longitudinal cross-section of the tubular laminate taken in the direction of the arrows 4—4 of FIG. 3.

With reference to the drawing, and specifically to FIG. 1, a layer of glass cloth 10 of given thickness is first cut to a predetermined flat pattern in accordance with the length, taper and the wall thickness of a tubular laminate, as will appear. In the particular embodiment illustrated, the glass cloth has been impregnated with an adhesive binder, such as for example, epoxy resin. In some circumstances other adhesives such as a phenolic resin may be used or the adhesive may be introduced as a separate step in the method. Situated and lying immediately above the layer 10 is a second layer 11 of very thin tempered steel sheet, such as shim-stock, having a thickness, for example, in the range of .001" to .004". The metal sheet will previously have been cleaned by immersion in a chemical bath to remove any oxide film, grease or other substance which might impair the bond between the surface of the metal and the epoxy resin. After cleaning, the metal sheet may be slightly roughened by sand-blasting to insure a greater and more uniform bond between the metal and the glass cloth.

The layers of cloth and of metal are each of approximately the same length and have been die-cut in flat pattern form to match the taper of a mandrel 11 about which the layers 10, 11 are to be rolled. The glass cloth 10, as illustrated, is somewhat wider than the sheet steel to form two uncovered marginal lengthwise strips 13 and 14, which comprise starting and finishing turns respectively, when the layers are rolled upon the mandrel.

The edge of the marginal strip 13 is attached to the mandrel, which is then rotated to roll the contiguous layers into a tapered tube or shaft 15 (FIGS. 2-4). As shown particularly in FIGS. 3 and 4, marginal strip 13 forms two complete adjacent turns of glass cloth, which are initially wound upon the mandrel 12. Marginal strip 14 comprises two complete adjacent outer or finishing turns of glass cloth. Thus, the sheet metal layer 11 is protected from air, moisture or other contamination by envelopment by the glass cloth.

The epoxy resin impregnating the glass cloth 10 is then cured to set the laminate permanently in tubular form and to bond the adjacent layers of metal sheet and cloth together. In some instances, depending upon the adhesive used, the raw laminate may be subjected to pressure, such as by vacuum-pressure molding, or to heat and pressure. Equipment for this purpose is well-known and need not be described.

After curing the adhesive, the mandrel will be removed and the shaft 15 may be polished before affixing thereto handle and club portions. The new laminated shaft may be finished in a wide variety of textures and colors by the use of different resin pigments and by varying the cloth weave and color.

With reference to FIG. 3, it will be observed that the layers 10, 11 are interwound as spirals. This arrangement permits the thin tempered steel sheet 11 greatly to reinforce and rigidize the glass cloth while maintaining the overall weight of the shaft at a minimum. By way of example only, if the finished shaft has a total weight of 4 ounces, the steel used in its construction will weigh approximately 2 ounces. The cumulative thicknesses of the successive windings at any longitudinal position determine the total wall thickness of the shaft at that point. By rolling, for example several inner or initial lead turns at a first longitudinal position, before the layers of material begin to be taken up or rolled at a second longitudinal position, the wall thickness at the first position may be increased respective of the thickness at the second. Consequently, the wall thickness of the shaft may be selectively controlled at any longitudinal position in accordance with desired flexibility patterns. It is also possible, by various rolling techniques, to form a shaft having a solid core throughout its length or a shaft which is solid at any desired position along its length.

Within the context of the present invention, certain other materials may be utilized other than those specifically referred to in the foregoing description of a particular embodiment. Various textile fabrics may be chosen instead of glass cloth; however, the latter possesses particularly great tensile strength and is corrosion and rust resistant. Adhesives other than epoxy resin may be used. It is contemplated that thin sheets of brass, aluminum or metal screen may be substituted for steel in particular situations with beneficial results. Where fabric has been impregnated with an adhesive resin binder, additional adhesive may be applied to the metal layer before or during the forming of the laminate to increase the bonding effect, or the adhesive may be wholly introduced between the adjacent layers as the laminate is being formed.

It will be understood that changes may be made from what has been specifically shown and described without departing from the scope of the invention. The invention is defined in the following claims:

I claim:

1. A tubular laminated golf club shaft comprising a hollow shaft including a plurality of successive radially spaced layers of cloth and metal bonded together in lengthwise contacting relation, each of said metal layers having a thickness in the range of .001" to .004" and forming a spiral in cross section at any point lengthwise of said shaft, at least some of said layers of cloth being radially spaced by an intermediate layer of metal.

2. A tubular laminated golf club shaft comprising a plurality of bonded glass cloth and sheet metal layers in lengthwise contacting relation and defining interwound spirals in cross section.

3. A tubular laminated golf club shaft comprising a plurality of bonded glass cloth and sheet metal layers in lengthwise contacting relation and defining, in cross section, interwound spirals about a hollow core.

4. A tubular laminated golf club shaft comprising a plurality of glass cloth and metal layers bonded to each other in lengthwise contacting relation, each of said metal layers having a thickness in the range of .001" to .004" and defining an interwound spiral in cross section at any point lengthwise of said shaft.

5. A tubular laminated golf club shaft according to claim 4 in which said metal layer is tempered sheet steel.

6. A tubular laminated golf club shaft according to claim 5 in which said shaft has a predetermined longitudinal taper and uniform wall thickness.

7. The method of forming a laminated golf-club shaft from a layer of fabric and a layer of metal having a thickness in the range of .001" to .004", one of said fabric and metal layers being coated with an adhesive selected from the group consisting of an epoxy resin and a phenolic resin suitable for bonding said metal layer to said fabric layer, comprising the steps of arranging said layers in contacting lengthwise relation, rolling said layers while in contacting relation into a generally cylindrical form comprising a plurality of turns wherein said metal layer is situated intermediate said fabric layer, and curing said adhesive to bond said metal and fabric layers together.

8. The method of forming a laminated golf-club shaft from a layer of glass cloth impregnated with an epoxy resin and a layer of tempered sheet steel having a thickness in the range of .001" to .004" comprising the steps of cutting said cloth to predetermined flat pattern dimensions, cutting said sheet steel to a length approximately that of said cloth and to a lesser width, placing said sheet steel in overlying coextensive lengthwise relation against said cloth to leave uncovered marginal edges of said cloth, attaching one of said marginal edges to a rotatable mandrel having a given taper, rotating said mandrel to wind thereupon said layers of glass cloth and sheet steel to form a tube, each of said marginal edges of glass cloth being sufficient in width to comprise at least one complete turn about the mandrel, curing said epoxy resin to bond together the adjacent turns of said tube, and removing said mandrel from the cured article thereby leaving a hollow tubular shaft.

9. The method according to claim 8, in which the thicknesses of the cloth and metal layers and the number of turns at longitudinal positions along the length of the shaft are controlled to produce a shaft having predetermined wall thickness at longitudinal positions along its length.

10. The method of forming a laminated golf club shaft from a layer of fabric and a layer of metal having a thickness in the range of .001" to .004", one of said fabric and metal layers being coated with an adhesive selected from the group consisting of an epoxy resin and a phenolic resin for bonding said metal layer to said fabric layer, comprising the steps of arranging said layers in contacting lengthwise relation, rolling said layers while in contacting relation upon a mandrel having a given taper thereby forming a generally cylindrical shaft comprising a plurality of turns wherein said metal layer is situated intermediate said fabric layer, curing said adhesive to bond said metal and fabric layers together, and removing said mandrel from the cured article thereby leaving a hollow tubular shaft.

11. The method of forming a laminated golf club shaft according to claim 10 wherein said adhesive is an epoxy resin.

12. The method of forming a laminated golf club shaft from a layer of glass cloth impregnated with an adhesive selected from the group consisting of an epoxy resin and a phenolic resin and a layer of tempered sheet steel having a thickness in the range of .001" to .004" comprising the steps of cutting said cloth to predetermined flat pattern dimensions, cutting said sheet steel to a length approximately that of said cloth and to a lesser width, placing said sheet steel in overlying coextensive lengthwise relation against said cloth to leave uncovered marginal edges of said cloth, attaching one of said marginal edges to a rotatable mandrel to wind thereupon said layers of glass cloth and sheet steel to form a tube, each of said marginal edges of glass cloth being sufficient in width to comprise at least one complete turn about the mandrel, curing said adhesive to bond together the adjacent turns of said tube, and removing said mandrel from the cured article thereby leaving a hollow tubular shaft.

References Cited in the file of this patent

UNITED STATES PATENTS

| | | |
|---|---|---|
| 1,400,078 | Kempton | Dec. 13, 1921 |
| 1,688,178 | Drevitson | Oct. 16, 1928 |
| 1,844,512 | Mains | Feb. 9, 1932 |
| 2,173,359 | Freedlander | Sept. 19, 1939 |
| 2,315,217 | Obiglio | Mar. 30, 1943 |
| 2,354,556 | Stahl | July 25, 1944 |
| 2,748,805 | Winstead | June 5, 1956 |
| 2,809,144 | Grimes | Oct. 8, 1957 |
| 2,991,080 | Redmond | July 4, 1961 |
| 3,063,888 | Howard et al. | Nov. 13, 1962 |

FOREIGN PATENTS

| | | |
|---|---|---|
| 555,027 | Great Britain | July 9, 1943 |